(12) United States Patent
Sumitomo

(10) Patent No.: US 10,000,327 B2
(45) Date of Patent: Jun. 19, 2018

(54) TIP INDICATOR AND PACKAGING BOX EQUIPPED WITH SAME

(71) Applicant: KYOCERA Document Solutions Inc., Osaka (JP)

(72) Inventor: Seiji Sumitomo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 155 days.

(21) Appl. No.: 15/025,769

(22) PCT Filed: Oct. 30, 2014

(86) PCT No.: PCT/JP2014/078849
§ 371 (c)(1),
(2) Date: Mar. 29, 2016

(87) PCT Pub. No.: WO2015/072332
PCT Pub. Date: May 21, 2015

(65) Prior Publication Data
US 2016/0229617 A1    Aug. 11, 2016

(30) Foreign Application Priority Data
Nov. 18, 2013  (JP) .................................. 2013-237685

(51) Int. Cl.
*B65D 79/02*    (2006.01)
*B65D 19/38*    (2006.01)
(Continued)

(52) U.S. Cl.
CPC ............. *B65D 79/02* (2013.01); *B65D 19/20* (2013.01); *B65D 19/38* (2013.01); *B65D 81/056* (2013.01);
(Continued)

(58) Field of Classification Search
CPC .... B65D 79/02; G01C 9/10; G01C 2009/107; G01L 5/0085
(Continued)

(56) References Cited

U.S. PATENT DOCUMENTS 3,688,734 A * 9/1972 Davis .................. G01C 9/00
116/200
3,926,144 A * 12/1975 Lander .................. G01C 9/10
116/200
(Continued)

FOREIGN PATENT DOCUMENTS

JP    S39-29470 Y1    10/1964
JP    3123365 U    6/2006
(Continued)

OTHER PUBLICATIONS

International Search Report dated Feb. 3, 2015, issued to International Application No. PCT/JP2014/078849.

*Primary Examiner* — Steven A. Reynolds
(74) *Attorney, Agent, or Firm* — Stein IP, LLC

(57) ABSTRACT

Provided is a tip indicator that enables reduced manufacturing costs with a simple configuration, can be made lighter in weight, and is capable of detecting tipping over of a packaging box and the like. This tip indicator is fixed to a packaging box and is equipped with a main body that has a passage section and a moving object. The passage section has a first holding part and a second holding part. The moving object is held by the first holding part when the main body is in an initial position, and the moving object moves through the passage section and is held by the second holding part when the main body has been returned to the initial position after having been turned by 90 degrees in a first direction and then by 90 degrees in a second direction, that is, a direction opposite to the first direction.

9 Claims, 9 Drawing Sheets

(51) Int. Cl.
  *B65D 19/20* (2006.01)
  *B65D 81/05* (2006.01)
  *G01C 9/10* (2006.01)

(52) U.S. Cl.
  CPC ............ *G01C 9/10* (2013.01); *B65D 2313/08* (2013.01); *B65D 2519/00019* (2013.01); *B65D 2519/00054* (2013.01); *B65D 2519/00089* (2013.01); *B65D 2519/00159* (2013.01); *B65D 2519/00194* (2013.01); *B65D 2519/00273* (2013.01); *B65D 2519/00288* (2013.01); *B65D 2519/00293* (2013.01); *B65D 2519/00318* (2013.01); *B65D 2519/00343* (2013.01); *B65D 2519/00497* (2013.01); *B65D 2519/00597* (2013.01); *B65D 2519/00621* (2013.01); *B65D 2519/00661* (2013.01); *B65D 2519/00666* (2013.01); *B65D 2519/00815* (2013.01)

(58) Field of Classification Search
  USPC ....... 206/459.1; 33/365, 366, 368; 73/12.06; 116/203, 215
  See application file for complete search history.

(56) References Cited

U.S. PATENT DOCUMENTS

| | | | | |
|---|---|---|---|---|
| 4,438,720 | A * | 3/1984 | Conn | G01C 9/00 116/215 |
| 8,530,757 | B2 * | 9/2013 | Dinh | H02G 3/088 174/481 |
| 8,671,582 | B2 * | 3/2014 | Branch | G01C 9/08 116/215 |
| 9,329,094 | B2 * | 5/2016 | Noguchi | G01L 5/0052 |
| 2010/0281946 | A1 * | 11/2010 | Naruishi | G01C 9/10 73/12.06 |
| 2010/0300178 | A1 * | 12/2010 | Naruishi | G01L 5/008 73/12.06 |
| 2014/0069837 | A1 * | 3/2014 | Naruishi | B65D 79/02 206/459.1 |

FOREIGN PATENT DOCUMENTS

| | | |
|---|---|---|
| JP | 3145187 U | 10/2008 |
| JP | 2009-96625 A | 5/2009 |
| JP | 2010-85132 A | 4/2010 |
| JP | 2011-7771 A | 1/2011 |

\* cited by examiner

TIP INDICATOR AND PACKAGING BOX EQUIPPED WITH SAME

CROSS-REFERENCE TO RELATED APPLICATIONS

This application is a national stage of International Application No. PCT/JP2014/078849, filed Oct. 30, 2014, which claims the benefit of priority to Japanese Application No. 2013-237685, filed Nov. 18, 2013, in the Japanese Patent Office, the disclosures of which are incorporated herein by reference.

TECHNICAL FIELD

The present invention relates to: a tip indicator that detects a history of having ever been overturned (hereinafter an overturned state) and the like of products such as, for example, an electronic device and the like when transporting or storing the products; and a packaging box that includes the tip indicator.

BACKGROUND ART

Conventionally, in a case where a product such as an electronic device or the like is packaged by using a packaging box, it is a general method to dispose a cushioning material, which cushions external impact and vibration during transportation, between the product (packaged article) and the packaging box such as a cardboard case or the like. As the cushioning material, there are cushioning materials and the like used such as a folded cardboard, a recyclable pulp-molded cushioning material that uses old paper.

In the meantime, in a case where the packaging box is overturned or is transported in the overturned state when transporting or storing the product packaged in the packaging box, impact is cushioned by the cushioning material, but some impact is conducted to inside. Because of this, there is a case where the packaging box is not broken and only the inside product is broken. In such a case, the breakage of the product is not confirmed until the packaging box is opened. Accordingly, it is difficult to determine whether the breakage of the product occurred during the production or occurred when delivering or storing.

Accordingly, a patent literature 1 discloses a cushioning material with an impact sensor that includes a supersaturated solution, a first containing material and a second containing material that contain the solution, wherein upon being subjected to external force such as impact, vibration and the like, the solution changes its state visually to allow visual confirmation of being subjected to the external force.

CITATION LIST

Patent Literature
PLT1: JP-A-2010-085132

SUMMARY OF INVENTION

Technical Problem

However, the cushioning material with the impact sensor described in the patent literature 1 needs to dispose the solution throughout an entirety of the cushioning material. Accordingly, there is a problem that the cushioning material becomes heavy.

Besides, to bring the solution to the supersaturated state, it is necessary to heat and adjust a solvent at a predetermined temperature, add a solute to the solvent and stir it, thereafter, inject the solution into a protruding portion of the first containing material and seal it by gluing the second containing material. Because of this, there are problems that the production process becomes cumbersome and the production is costly.

The present invention has been made to solve the above problems, and it is an object of the present invention to provide: a tip indicator that is able to reduce the production cost with a simple structure, achieve a light weight, and detect an overturned state and the like of a packaging box; and a packaging box that includes the tip indicator.

Solution to Problem

A tip indicator according to an aspect of the present invention is a tip indicator that is fixed to a side surface of a packaging box configured to package an article to be packaged, indicates an overturned state of the packaging box, includes: a main body that includes a passage portion; a moving object that is disposed movably in the passage portion; and a sight window that allows visual confirmation of the moving object; wherein the passage portion includes a first holding portion and a second holding portion that hold the moving object; in a case where the main body is located at an initial position, the moving object is held by the first holding portion; and in a case where the main body rotates 90° in a first direction, thereafter, rotates 90° in a second direction opposite to the first direction to return to the initial position, the moving object moves in the passage portion to be held by the second holding portion.

Advantageous Effects of Invention

According to the present invention, in the case where the main body is located at the initial position, the moving object is held by the first holding portion, and in the case where the main body rotates 90° in the first direction, thereafter, rotates 90° in the second direction opposite to the first direction, the moving object moves in the passage portion to be held by the second holding portion. In this way, even in the case where the packaging box is overturned or is transported in the overturned state when transporting or storing the packaging box, thereafter, the packaging box is raised to be returned to the initial state, the moving object moves from the first holding portion to the second holding portion. Because of this, it is possible to determine the fact of overturning and the like of the packaging box at a glance, and in a case where the product (packaged article) in the packaging box is broken, it is possible to easily determine that the product is broken when delivering or storing. Accordingly, it is possible to clarify who is responsible for the case where the product is broken.

Besides, it is possible to constitute the tip indicator with the main body that has the passage portion, the moving object that is disposed movably in the passage portion, and the sight window that allows visual confirmation of the moving object. In this way, compared with the cushioning material with the impact sensor described in the above patent literature 1, it is possible to achieve a simple structure, simplify the production process and thereby reduce the production cost. Besides, it is not necessary to dispose the solution throughout the entirety of the cushioning material. Accordingly, it is also possible to achieve a light weight.

Besides, by fixing the tip indicator to the side surface of the packaging box, a transporter recognizes presence of the tip indicator. In this way, it is expectable that the transporter handles the packaging box carefully.

Still other objects of the present invention and specific advantages obtained by the present invention will become more apparent from the following description of embodiments.

DESCRIPTION OF EMBODIMENTS

Figure 1:
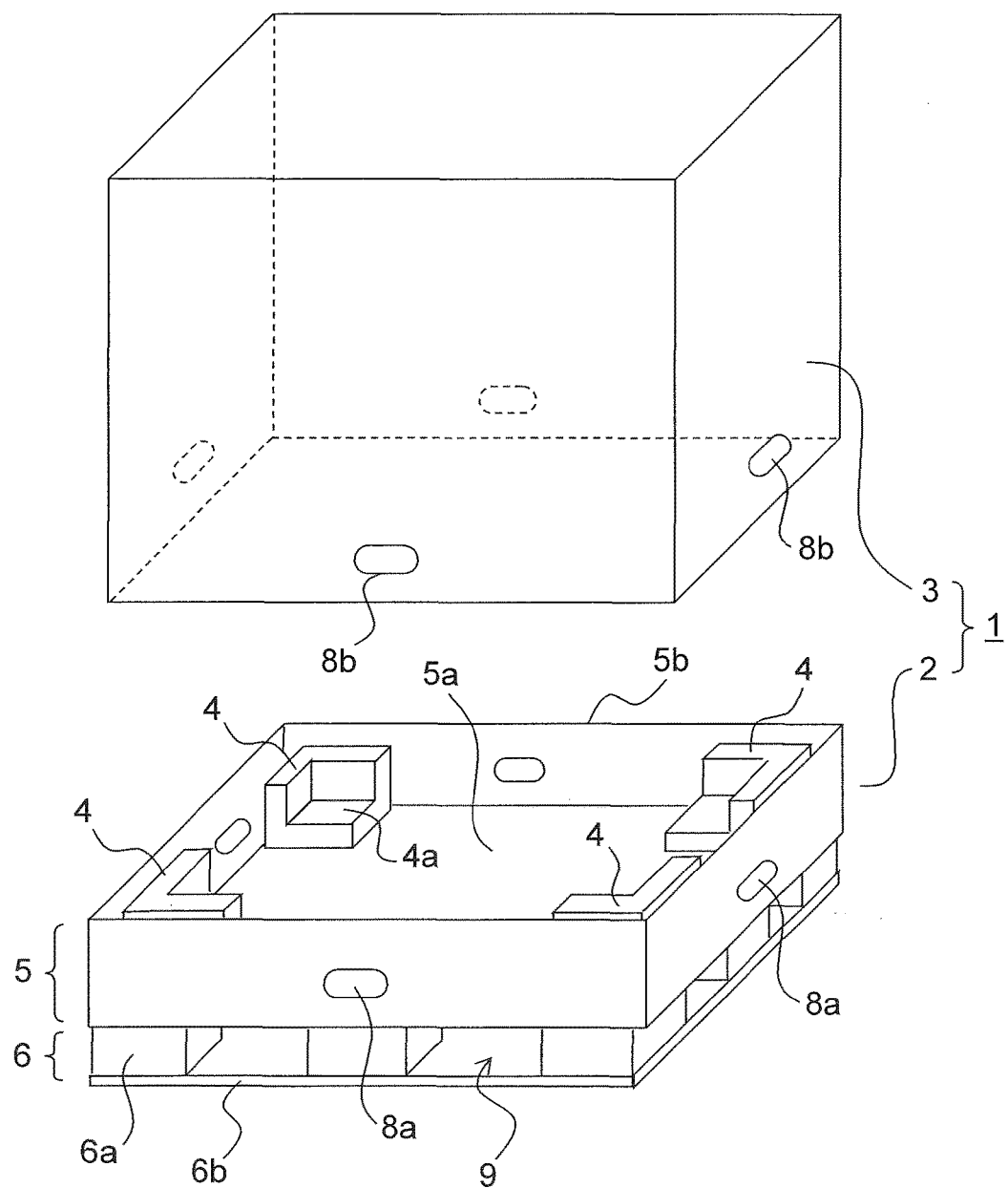
FIG. 1 is a decomposition perspective view showing an example of a packaging box to which a tip indicator according to a first embodiment of the present invention is fixed.

Hereinafter, embodiments of the present invention are described with reference to the drawings.

First Embodiment

With reference to FIG. 1 to FIG. 5D, a tip indicator 10 according to a first embodiment of the present invention and a packaging box 1 to which the tip indicator is fixed are described.

The packaging box 1 is composed of a tray-equipped pallet 2, an upper box 3 which covers a side surface and upper surface of a packaged article (product) and a bottom surface of which is opened, and a cardboard cushioning material 4 that is disposed on the tray-equipped pallet 2 and protects the packaged article from external impact. The cushioning material 4 is provided with a product placement surface 4a in accordance with a shape of the packaged article.

The tray-equipped pallet 2 includes: a tray 5 that includes a bottom surface 5a on which the packaged article (not shown) is placed and a side wall 5b formed upright on a circumferential edge of the bottom surface 5a; and a pallet 6 fixed to a lower surface of the tray 5, and the cushioning material 4 is disposed at four corners of the bottom surface 5a over a predetermined gap from the side wall 5b. A lower portion of the upper box 3 is provided with a through-hole 8b through a position aligned with a through-hole 8a of the side wall 5b, and by inserting a not-shown fastener with the through-holes 8a, 8b aligned with each other, the tray-equipped pallet 2 and the upper box 3 are integrally connected to each other.

A cut-and-raised piece (not shown) disposed on the bottom surface 5a is inserted in a lower surface of the cushioning material 4, each cushioning material 4 is positioned at a predetermined position, and does not deviate in a horizontal direction. In the meantime, the cushioning material 4 may be fixed on the bottom surface 5a by using another method such as gluing or the like.

The pallet 6 includes a plurality of pillar portions 6a that are formed by folding a cardboard, for example, a ceiling plate (not shown) and a bottom plate 6b fixed to upper and lower surfaces of each pillar portion 6a, wherein an arm inserting hole 9, into which an arm of a fork lift or hand pallet (pallet transporting truck) is inserted, is formed between the pillar portions 6a.

Next, a procedure for packaging a product by using the packaging box 1 shown in FIG. 1 is described. First, the product (not shown) is placed on the product placement surface 4a of the cushioning material 4 that is disposed on the bottom surface 5a of the tray-equipped pallet 2. Next, when necessary, a cushioning material is placed on both an upper surface and a side surface of the product as well, thereafter, the cylindrical upper box 3 is put on.

Lastly, by inserting a fastener 7 (see FIG. 2) with the through-hole 8a of the side wall 5b and the through-hole 8b of the upper box 3 aligned with each other, the tray-equipped pallet 2 and the upper box 3 are integrally connected to each other. By using this packaging box 1, it is not necessary to place the packaging box onto a pallet after packaging the product. Accordingly, the packaging and transporting of an especially large product and the like become easy.

Figure 3A:
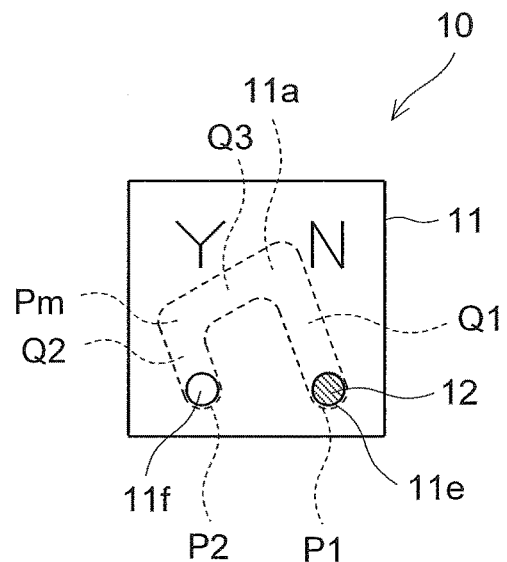
FIG. 3A is a front view showing a structure of the tip indicator according to the first embodiment of the present invention.

Next, the tip indicator 10, fixed to the packaging box 1, according to the first embodiment of the present invention is described. As shown in FIG. 3A, the tip indicator 10 is composed of a main body 11 having a passage portion 11a, and a moving object 12 that is disposed movably in the passage portion 11a.

The main body 11 is formed by folding, for example, a cardboard formed into predetermined shape, or a plate material formed of plastic, and has a three-layer structure.

Figure 3B:
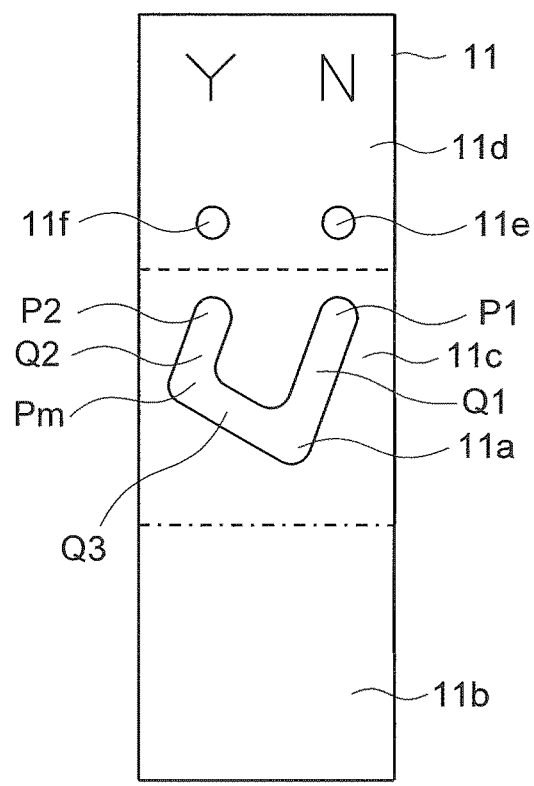
FIG. 3B is a development view showing a state in which a main body of the tip indicator according to the first embodiment of the present invention is developed.

Specifically, as shown in FIG. 3B, the main body 11 includes a rear surface portion (back surface layer) 11b, an intermediate portion (intermediate layer) 11c provide with the passage portion 11a, and a front surface portion (front surface layer) 11d provided with sight windows 11e and 11f that allow visual confirmation of the moving object 12. And, as described later, by folding the main body 11 along a border (one-dot-one-bar line in FIG. 3B) between the rear surface portion 11b and the intermediate portion 11c and along a border (broken line in FIG. 3B) between the intermediate portion 11c and the front surface portion 11d, the three-layer structure is formed. In the meantime, in FIG. 3B and FIG. 4, the broken line shows a ridge folding line, and the one-dot-one-bar line shows a valley folding line.

A both-side adhesive tape (not shown) is attached to a rear surface of the rear surface portion 11b, and the tip indicator 10 is glued and fixed to a side surface of the packaging box 1 by the both-side adhesive tape.

The passage portion 11a of the intermediate portion 11c is formed to penetrate the plate material. Besides, as shown in FIG. 3A, the passage portion 11a is formed into a substantially C-shape that has a first passage portion Q1, a second passage portion Q2, and a third passage portion Q3 that connects one end of the first passage portion Q1 and one end of the second passage portion Q2 to each other. In the meantime, in the specification and claims, the "C-shape" is a concept that covers a U-shape.

A lower portion of the first passage portion Q1 is provided with a first holding portion P1 that holds the moving object 12 in a case where the main body 11 is located at an initial position. A lower portion of the second passage portion Q2 is provided with a second holding portion P2. The second holding portion P2 is a position where the moving object 12 is held when the main body 11 rotates 90° in a clockwise direction (second direction) after rotating 90° in a counterclockwise direction (first direction). The third passage portion Q3 is provided with an intermediate position Pm where the moving object 12 is held when the main body 11 rotates 90° from the initial position in the counterclockwise direction (first direction).

The first passage portion Q1 is inclined in the counterclockwise direction (first direction) around the first holding portion P1 with respect to the side surface of the packaging box 1. The second passage portion Q2 is inclined in the counterclockwise direction (first direction) around the second holding portion P2 with respect to the side surface of the packaging box 1. And, the first passage portion Q1 and the second passage portion Q2 are formed to be substantially parallel with each other. Besides, the third passage portion Q3 is formed to be substantially perpendicular to the first passage portion Q1 and the second passage portion Q2.

The sight windows 11e and 11f of the front surface portion 11d are formed at positions corresponding to the first holding position P1 and the second holding position P2, respectively. Besides, the sight windows 11e and 11f are formed to penetrate the plate material and formed to be slightly smaller than a diameter of the moving object 12. In the meantime, the sight windows 11e and 11f may be provided with a transparent (allowing visual confirmation) film member and the like. In this case, the film member and the like is able to prevent the moving object 12 from passing through the sight windows 11e and 11f. Accordingly, the sight windows 11e and 11f may be formed to be larger than the diameter of the moving object 12.

Display, which notifies presence of an overturned state of the packaging box 1 in accordance with a position of the moving object 12, is applied to the front surface portion 11d.

Here, a letter "N" is printed above the first holding portion P1, so that it is possible to confirm that the packaging box 1 has not been overturned in the counterclockwise direction (first direction) if the moving object 12 is located at the position of the first holding portion P1. On the other hand, a letter "Y" is printed above the second holding portion P2, so that it is possible to confirm that the packaging box 1 has been overturned in the counterclockwise direction (first direction) if the moving object 12 is located at the position of the second holding portion P2.

The moving object 12 is formed into a disc shape by using a metal or the like to easily move in the passage portion 11a under its weight. Besides, the moving object 12 is colored and patterned (hatching in the figure) differently from the main body 11 to be easily confirmed visually.

Figure 4:
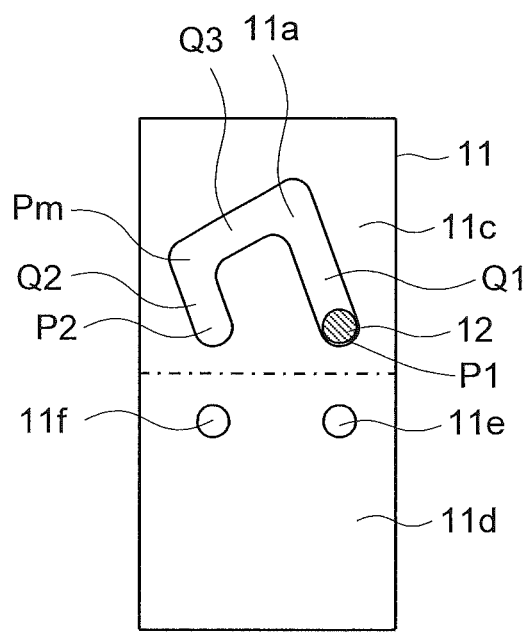
FIG. 4 is a view for describing a production method of the tip indicator according to the first embodiment of the present invention.

As a method for producing the tip indicator 10, from the state shown in FIG. 3B, the intermediate portion 11c and the front side portion 11d are folded toward the rear surface portion 11b to form a valley along a border (one-dot-one-bar line in FIG. 3B) between the rear surface portion 11b and the intermediate portion 11c. And, the moving object 12 is disposed in the passage portion 11a, so that a state shown in FIG. 4 is obtained. Thereafter, the intermediate portion 11c and the front surface portion 11d are folded to form a valley along a border (one-dot-one-bar line) between them, so that the tip indicator 10 shown in FIG. 3A is obtained. In the meantime, the folding fixing method of the tip indicator 10 may be gluing fixing by using a both-side adhesive tape or the like or fixing by using a clip, a belt, or the like.

Figure 5A:
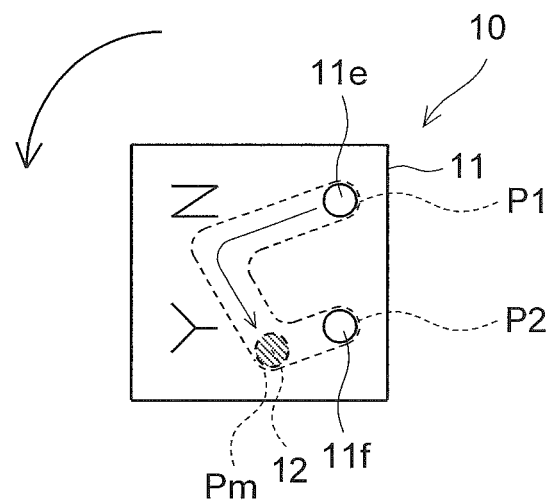
FIG. 5A is a view showing a state in which the tip indicator according to the first embodiment of the present invention is rotated 90° from an initial state in a counter-clockwise direction (first direction).
Figure 5B:
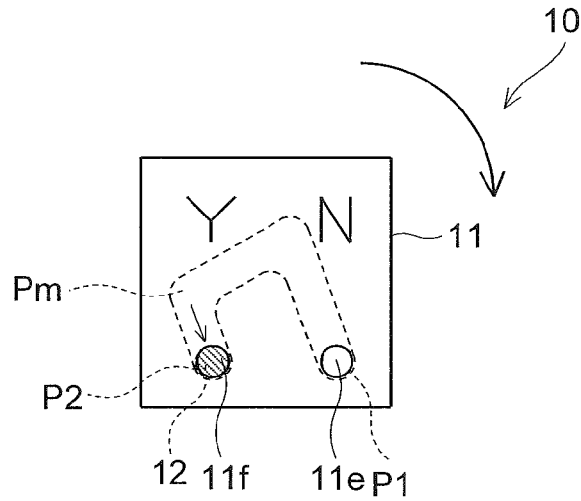
FIG. 5B is a view showing a state in which the tip indicator is rotated 90° from the state shown in FIG. 5A in a clockwise direction (second direction).

As shown in FIG. 3A, in the tip indicator 10, in the case where the main body 11 is located at the initial position, the moving object 12 is disposed at the first holding position P1 of the passage portion 11a. And, if the main body 11 rotates 90° in the counterclockwise direction (first direction) from the initial position, as shown in FIG. 5A, the moving object 12 moves to the intermediate position Pm. Thereafter, if the main body 11 rotates 90° in the clockwise direction (second direction), as shown in FIG. 5B, the moving object 12 moves to the second holding position P2. In this way, in the case where the packaging box 1 is overturned in the counterclockwise direction (first direction) due to some cause when transporting the packaging box 1, even if the packaging box 1 is returned to the original state (position), the moving object 12 moves from the first holding portion P1 to the second holding portion P2. Accordingly, it is possible to confirm later that the packaging box 1 was overturned in the counterclockwise direction (first direction).

Figure 5C:
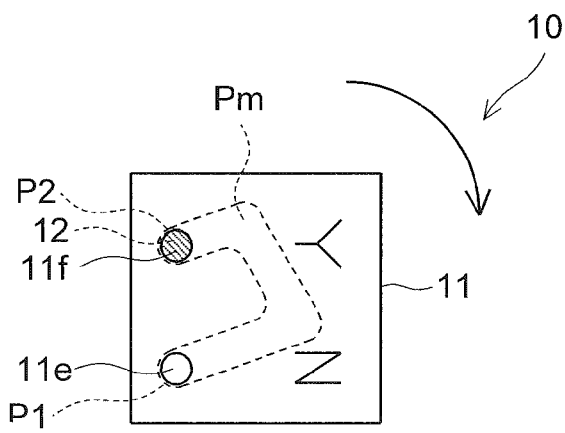
FIG. 5C is a view showing a state in which the tip indicator is rotated 90° from the state shown in FIG. 5B in the clockwise direction (second direction).
Figure 5D:
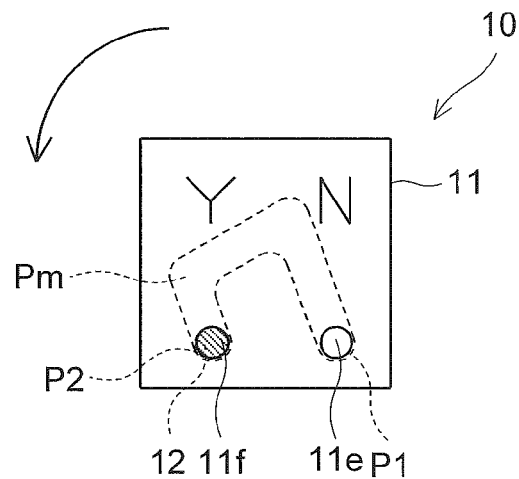
FIG. 5D is a view showing a state in which the tip indicator is rotated 90° from the state shown in FIG. 5C in the counterclockwise direction (first direction).

Besides, even if the main body 11 rotates 90° in the clockwise direction (second direction) from the state (state in which the main body 11 is returned to the original position after the main body 11 rotates in the counterclockwise direction (first direction)) shown in FIG. 5B, as shown in FIG. 5C, the moving object 12 does not move from the second holding portion P2. Thereafter, even if the main body 11 rotates 90° in the counterclockwise direction (first direction), as shown in FIG. 5D, the moving object 12 does not move from the second holding portion P2. In this way, even if the packaging box 1 is returned to the original state after the packaging box 1 is overturned in the counterclockwise direction (first direction); thereafter, to cover up the overturning of the packaging box 1 in the counterclockwise direction (first direction), even if the packaging box 1 is returned to the original state after the packaging box 1 is made to overturn in the clockwise direction (second direction), the moving object 12 does not move from the second holding portion P2 (does not return to the first holding portion P1). Because of this, it is difficult to cover up that the packaging box 1 was overturned in the counterclockwise direction (first direction). Besides, if the tip indicator 10 is attached to an opposite side surface of the packaging box 1 as well, in the case where the packaging box 1 is overturned in the clockwise direction (second direction) further from the state shown in FIG. 5B, the moving object 12 is disposed at the second holding portion P2 in both tip indicators 10. In this way, it is possible to confirm later that the packaging box 1 was overturned in both the counterclockwise direction (first direction) and the clockwise direction (second direction).

In the meantime, even if the main body 11 rotates 90° from the initial position in the clockwise direction (second direction), the moving object 12 does not move from the first holding portion P1. Thereafter, even if the main body 11 is returned to the original state, the moving object 12 does not move from the first holding portion P1.

Figure 2:
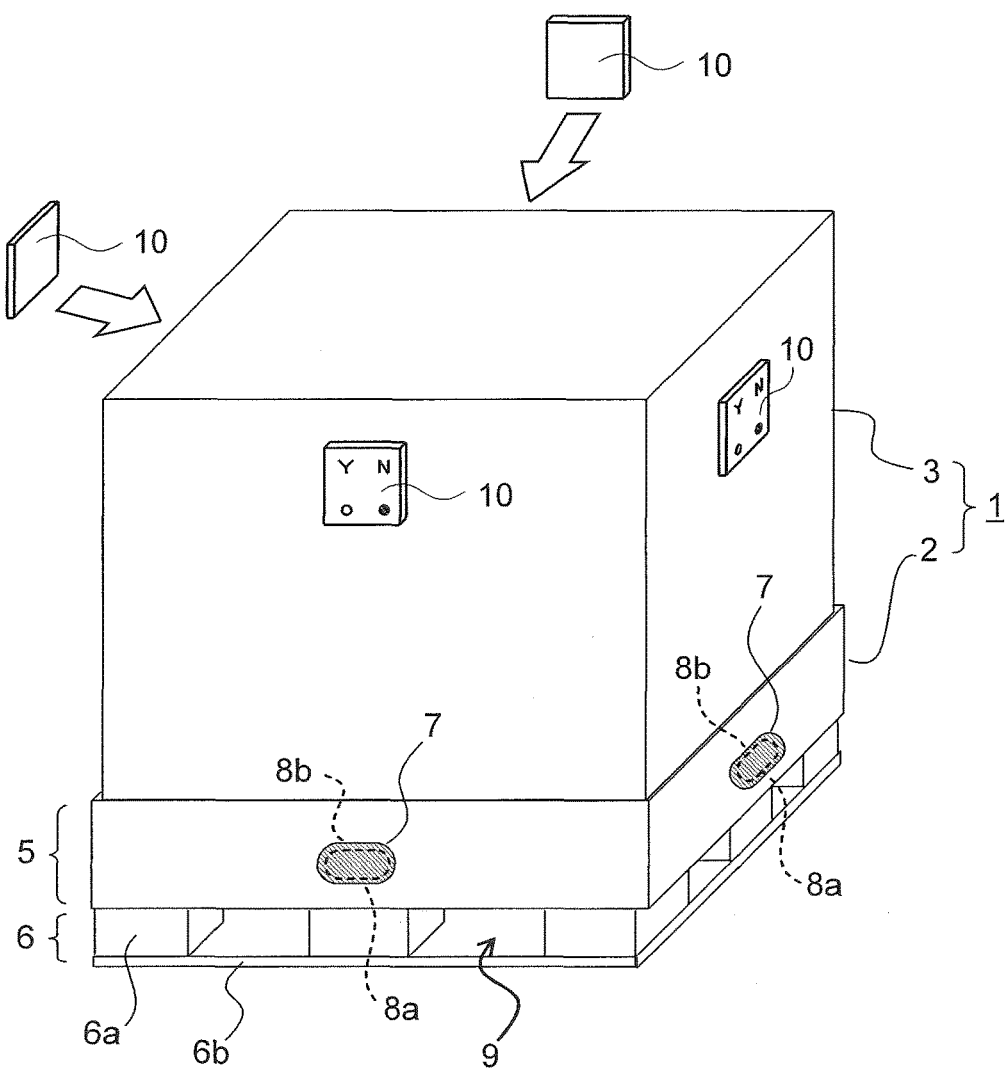
FIG. 2 is a perspective view showing a state in which a product (article to be packaged) is packaged in the packaging box in FIG. 1 and the tip indicator according to the first embodiment is fixed.

In the present embodiment, as shown in FIG. 2, the tip indicator 10 is attached to each of four side surfaces of the packaging box 1. Accordingly, even if the packaging box 1 is overturned in any direction, it is possible to confirm later.

In the present embodiment, as described above, the moving object 12 is held by the first holding portion P1 in the case where the main body 11 is located at the initial position, and in the case where the main body 11 rotates 90° in the clockwise direction (second direction) to return to the initial position after the main body 11 rotates 90° in the counterclockwise direction (first direction), the moving object 12 moves in the passage portion 11a to be held by the second holding portion P2. In this way, even in the case where the packaging box 1 is overturned or is transported in the overturned state when transporting or storing the packaging box 1, thereafter, the packaging box 1 is raised to be returned to the initial state (position), the moving object 12 moves from the first holding portion P1 to the second holding portion P2. Because of this, it is possible to determine the fact of the overturning and the like of the packaging box 1 at a glance, and in the case where the product (packaged article) in the packaging box 1 is broken, it is possible to easily determine that the product is broken when delivering or storing. Accordingly, it is possible to clarify who is responsible for the case where the product is broken.

Besides, it is possible to constitute the tip indicator 10 with the main body 11 that has the passage portion 11a, and the moving object 12 that is disposed movably in the passage portion 11a. In this way, compared with the cushioning material with an impact sensor described in the above patent literature 1, it is possible to achieve a simple structure, simplify the production process and thereby reduce the production cost. Besides, it is not necessary to dispose the solution throughout the entirety of the cushioning material. Accordingly, it is also possible to achieve a light weight.

Besides, by fixing the tip indicator 10 to the side surface of the packaging box 1, the transporter recognizes the presence of the tip indicator 10. In this way, the transporter handles the packaging box 1 carefully. Accordingly, reduction in accidents during the transportation is expectable.

Besides, as described above, the passage portion 11a is formed into the substantially U-shape that is composed of the first passage portion Q1, the second passage portion Q2, and the third passage portion Q3 which connects the one end of the first passage portion Q1 and the one end of the second passage portion Q2 to each other, wherein the other end of the first passage portion Q1 includes the first holding portion P1, and the other end of the second passage portion Q2 includes the second holding portion P2. In this way, even in the case where the packaging box 1 is overturned or is transported in the overturned state when transporting or storing the packaging box 1, thereafter, the packaging box 1 is raised to be returned to the initial state, it is possible to easily make the moving object 12 move from the first holding portion P1 to the second holding portion P2.

Besides, as described above, the first passage portion Q1 is inclined in the counterclockwise direction (first direction) with respect to the side surface of the packaging box 1. In this way, the main body 11 rotates 90° from the initial position in the counterclockwise direction (first direction), whereby it is possible to easily make the moving object 12 move from the first holding portion P1.

Besides, as described above, the main body 11 includes the front surface portion 11d in which the sight windows 11e and 11f are disposed to oppose the first holding portion P1 and the second holding portion P2, the rear surface portion 11b that opposes the side surface of the packaging box 1, and the intermediate portion 11c that is sandwiched by the front surface portion 11d and the rear surface portion 11b, and provided with the passage portion 11a. In this way, it is possible to achieve the tip indicator 10 that has a simple structure.

Second Embodiment

Next, with reference to FIG. 6 to FIG. 9, a tip indicator 10a according to a second embodiment of the present invention is described.

Figure 6:
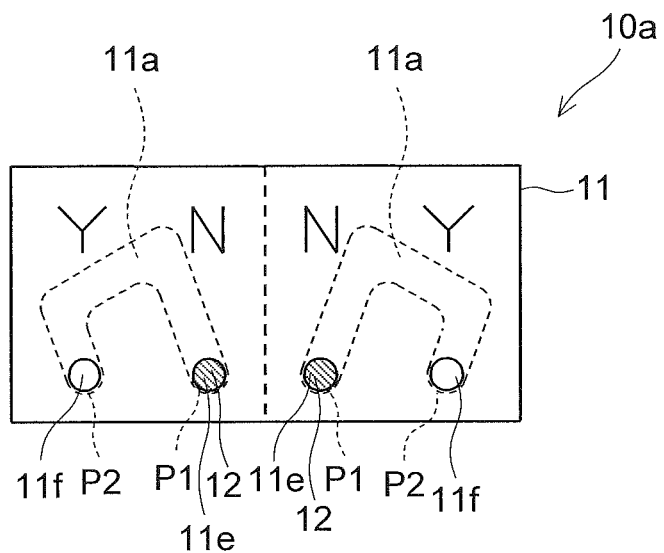
FIG. 6 is a front view showing a structure of a tip indicator according to a second embodiment of the present invention.
Figure 7:
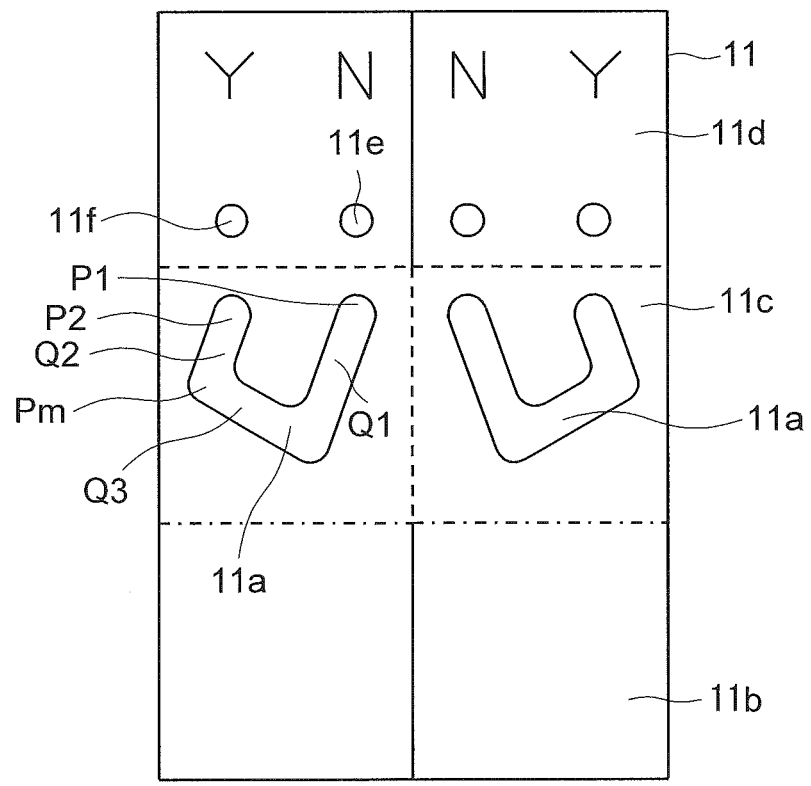
FIG. 7 is a development view showing a state in which a main body of the tip indicator according to the second embodiment of the present invention is developed.

As shown in FIG. 6 and FIG. 7, the tip indicator 10a according to the second embodiment of the present invention is obtained by connecting integrally the tip indicator 10 according to the first embodiment and a tip indicator obtained by reversing the tip indicator 10 in left and right positions to each other. Specifically, the tip indicator 10a is provided with a pair of the passage portions 11a and a pair of the moving objects 12. One passage portion 11a is formed symmetrically with the other passage portion 11a in a left-right direction, and one moving object 12 is formed symmetrically with the other moving object 12 in the left-right direction. Besides, the sight windows 11e and 11f are also disposed in pairs, wherein the sight windows 11e and 11f on one side are formed symmetrically with the sight windows 11e and 11f on the other side.

Besides, the main body 11 is formed foldably in the left-right direction along a central portion (broken line in FIG. 6). The passage portions 11a and the moving objects 12 are disposed on both left and right sides of a folding position to be symmetrical in the left-right direction with respect to the folding position (broken line in FIG. 6).

Figure 8:
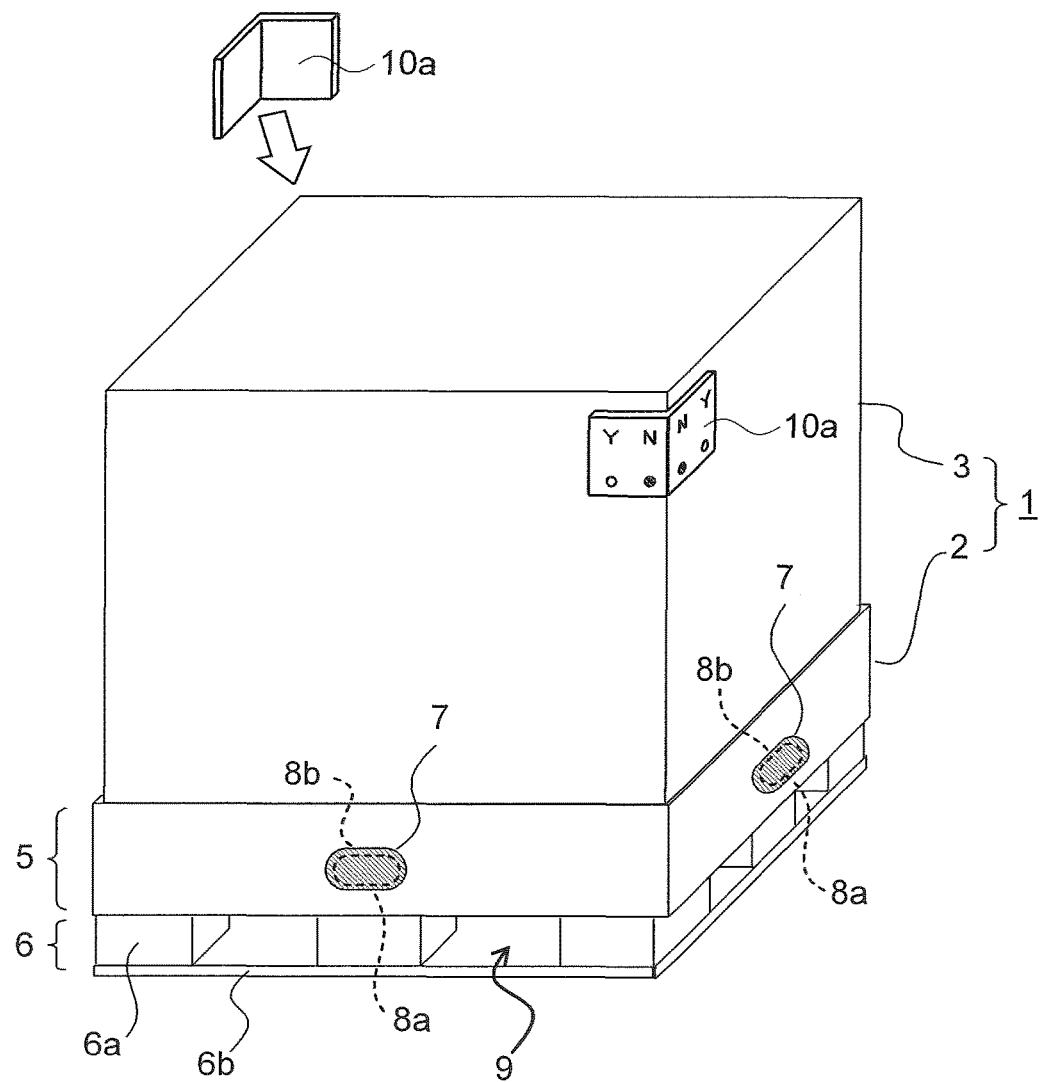
FIG. 8 is a perspective view showing a state in which the tip indicator according to the second embodiment of the present invention is fixed to a packaging box.

In the present embodiment, two tip indicators 10a are attached to the packaging box 1. For example, as shown in FIG. 8, the tip indicators 10a are folded along the central portion. And, one tip indicator 10a is attached to two adjacent side surfaces of the packaging box 1, and the other tip indicator 10a is attached to the remaining two side surfaces of the packaging box 1. As described above, the tip indicators 10 are fixed diagonally to the packaging box 1.

Figure 9:
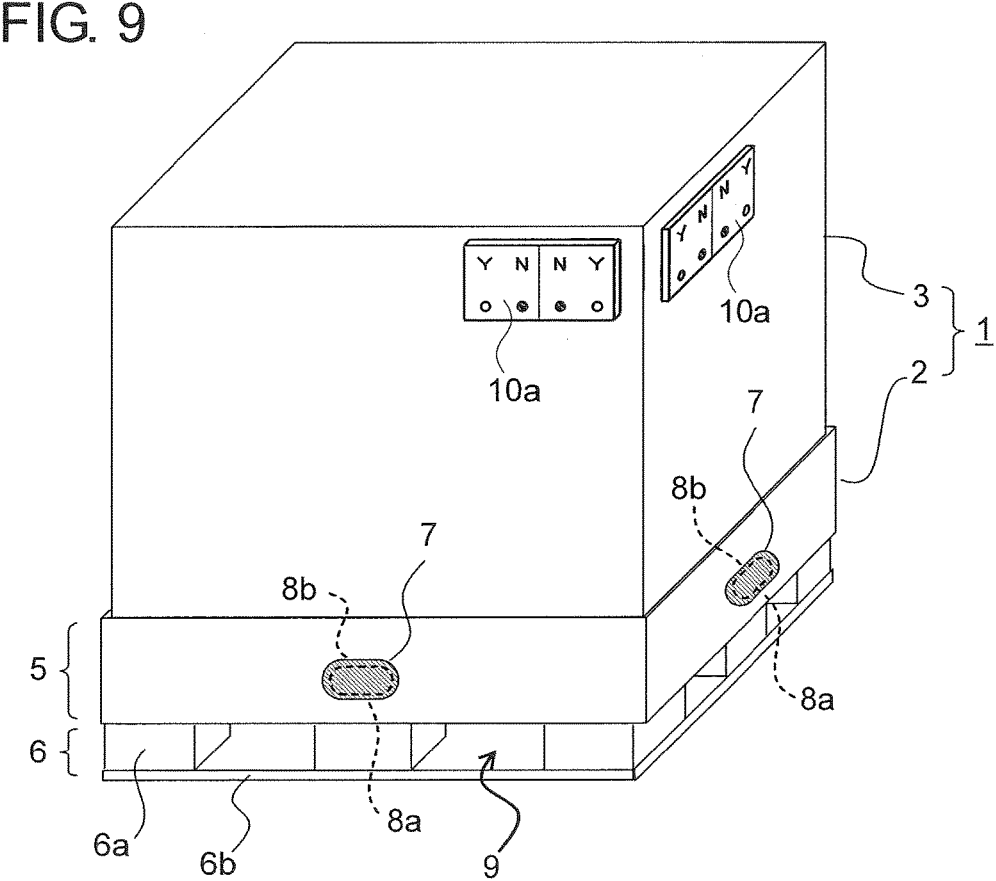
FIG. 9 is a perspective view in which the tip indicator according to the second embodiment of the present invention is fixed to only two side surfaces of a packaging box.

Besides, the main body 11 may not be formed foldably. And, for example, as shown in FIG. 9, the two tip indicators 10a may be separately attached to two adjacent side surfaces. At this time, the tip indicators 10a may be fixed to positions near a border line between the two side surfaces.

The other structures and production method of the second embodiment are the same as the above first embodiment.

In the present embodiment, as described above, the main body 11 is formed foldably in the left-right direction, and the passage portions 11a and the moving objects 12 are respectively formed on both left and right sides of the folding position of the main body 11. In this way, as shown in FIG. 8, it is possible to fix one tip indicator 10a to the two adjacent side surfaces of the packaging box 1.

Besides, as shown in FIG. 9, the tip indicator 10a is fixed to only two adjacent side surfaces of the four side surfaces of the packaging box 1, wherein each of the two adjacent side surfaces may be provided with the two passage portions 11a symmetrical with each other in the left-right direction and the moving objects 12 disposed in each passage portion 11a. According to such a structure, by only fixing the tip indicator 10a to the two side surfaces of the packaging box 1, it is possible to detect an overturned state in the four directions of the packaging box 1. Because of this, it is possible to facilitate the fixing work and visual confirmation of the tip indicator 10a.

The other effects of the second embodiment are the same as the above first embodiment.

Third Embodiment

Figure 10:
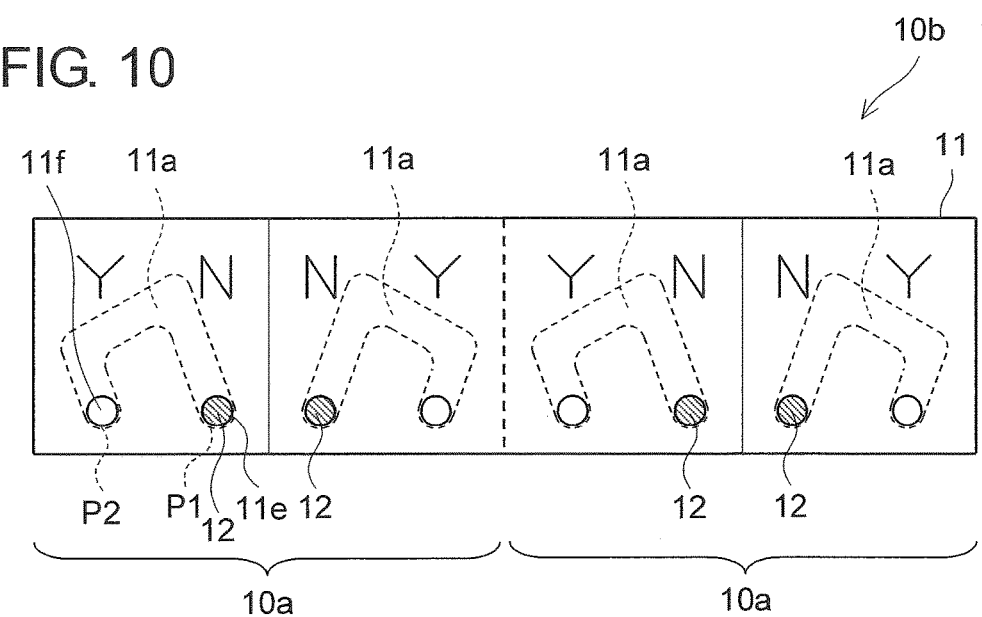
FIG. 10 is a front view showing a structure of a tip indicator according to a third embodiment of the present invention.
Figure 11:
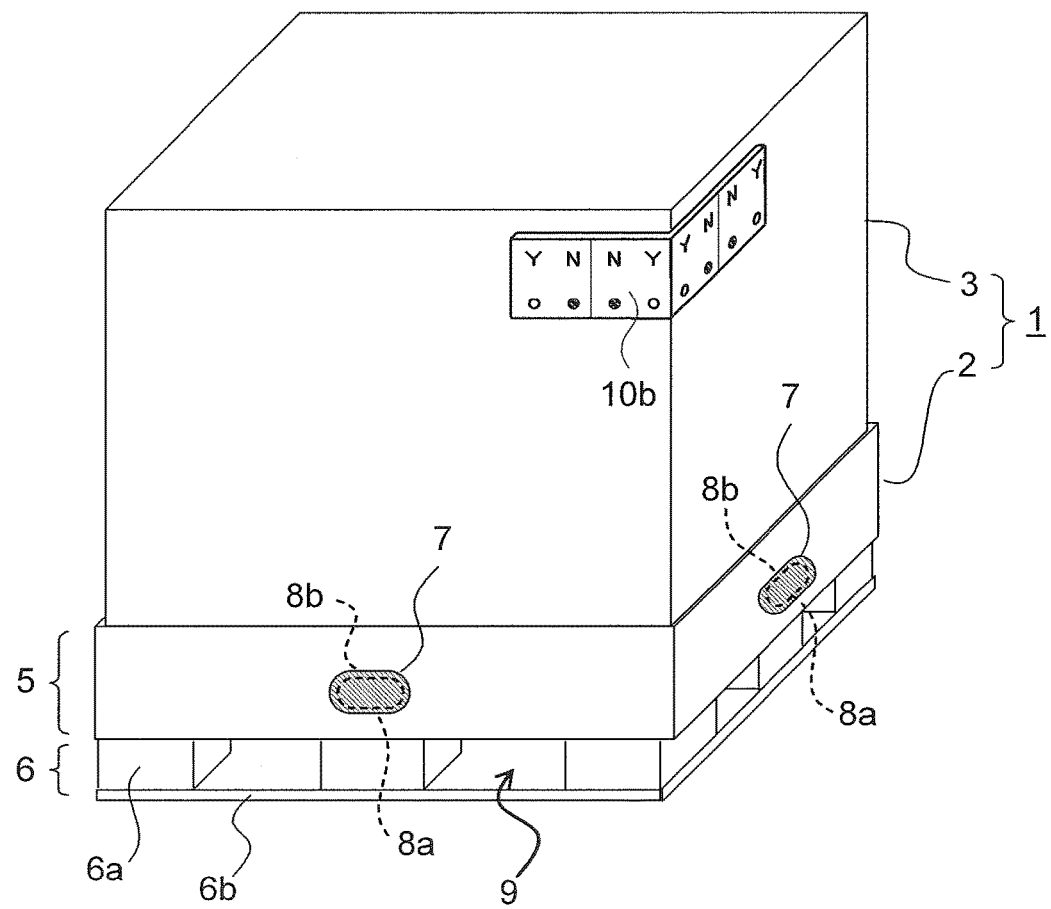
FIG. 11 is a perspective view showing a state in which the tip indicator according to the third embodiment of the present invention is fixed to a packaging box.

Next, with reference to FIG. 10 and FIG. 11, a tip indicator 10b according to a third embodiment of the present invention is described.

As shown in FIG. 10, the tip indicator 10b is obtained by connecting integrally two tip indicators according to the second embodiment to each other. Specifically, the tip indicator 10b is provided with four passage portions 11a and four moving objects 12.

Besides, the main body 11 is formed foldably in a left-right direction along a central portion (broken line in FIG. 10). The passage portions 11a and the moving objects 12 are disposed on both left and right sides of a folding position to be symmetrical in the left-right direction with respect to the folding position (broken line in FIG. 10).

In the present embodiment, one tip indicator 10b is attached to the packaging box 1. As shown in FIG. 11, the tip indicator 10b is folded along the central portion. And, the tip indicator 10b is attached to two adjacent side surfaces of the packaging box 1, but is not attached to the remaining two side surfaces of the packaging box 1.

The other structures and production method of the third embodiment are the same as the above second embodiment.

In the present embodiment, as described above, it is possible to detect an overturned state in the four directions of the packaging box 1 by using the one tip indicator 10b. Because of this, it is possible to more facilitate the fixing work of the tip indicator 10b.

The other effects of the third embodiment are the same as the above second embodiment.

In the meantime, it should be considered that the embodiments disclosed this time are examples in all respects and are not limiting. The scope of the present invention is not indicated by the above description of the embodiments but by the claims, and all modifications within the scope of the claims and the meaning equivalent to the claims are covered.

For example, in the above embodiments, the structure is used, in which the side wall 5b of the tray 5 is formed into a flap shape foldable with respect to the bottom surface 5a, raised after the upper case 3 is put on, and connected to each other by using a fastener, but a structure may be used, in which a portion or all the portions of the side wall 5b are removed, and the tray-equipped palette 2 and the upper case 3 are connected to each other by using a cable tie or the like. Besides, in the above embodiments, the packaging box 1 is described which uses the tray-equipped palette 2 composed of the tray 5 and the palette 6, but it goes without saying that the present invention is applicable likewise to the packaging box 1 that is not provided with the palette 6 but composed of only the upper case 3 and the tray 5.

Besides, in the above embodiments, the example is described, in which the passage portion is formed to penetrate the plate material composed of a cardboard or plastic and the disc-shaped moving object is used. However, the present invention is not limited to this. For example, a pipe-shaped passage portion and a moving object composed of a ball may be used. Besides, an aggregate of particles may be used as the moving object.

Figure 12:
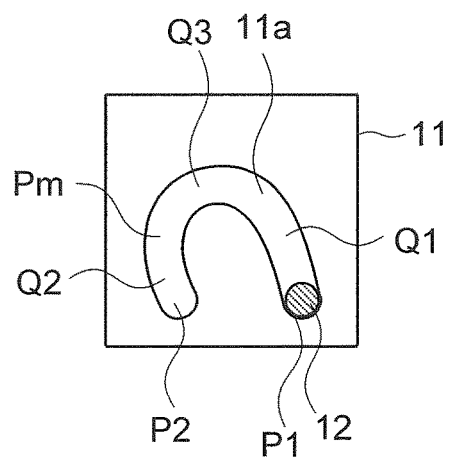
FIG. 12 is a front view showing a structure of a tip indicator according to a modification of the present invention except for a front surface portion.

Besides, in the above embodiments, the example is described, in which the passage portion 11a is formed into an angular shape (substantially C-shape). However, the present invention is not limited to this, and for example, like a tip indicator according to a modification of the present invention shown in FIG. 12, the passage portion 11a may be formed not to be angular (substantially U-shape).

Besides, also structures obtained by combining the structures of the above embodiments and modification are covered by the technical scope of the present invention.

The invention claimed is:

1. A tip indicator that is fixed to a side surface of a packaging box configured to package an article to be packaged and indicates an overturned state of the packaging box, comprising:
   a main body formed to be foldable symmetrically with respect to a central portion used as a folding position; and
   a first indicator portion and a second indicator portion provided on the main body symmetrically in the left-right direction about the folding position,
   wherein
   the first and second indicator portions each include:
   a passage portion,
   a moving object that is disposed movably in the passage portion, and
   a sight window that allows visual confirmation of the moving object,
   the passage portions each include a first holding portion and a second holding portion that hold the moving object, and
   in a case where the main body is located at an initial position, the moving object is held by the first holding portion, and in a case where the main body rotates 90° in a first direction from the first holding portion to the second holding portion, thereafter, rotates 90° in a second direction opposite to the first direction to return to the initial position, the moving object moves in the passage portion to be held by the second holding portion.

2. The tip indicator according to claim 1, wherein
   the passage portions are each formed into a substantially U-shape that is composed of a first passage portion, a second passage portion, and a third passage portion which connects one end of the first passage portion and one end of the second passage portion to each other, wherein the first holding portion is arranged at another end side of the first passage portion, and the second holding portion is arranged at another end side of the second passage portion.

3. The tip indicator according to claim 2, wherein
   in the case where the main body is located at the initial position, the passage portion has the substantially U-shape opened downward in which each of the first passage portion and the second passage portion extends downward from the third passage portion, and the substantially U-shape is inclined in the first direction with respect to the side surface of the packaging box.

4. A packaging box to which the tip indicator according to claim 1 is fixed.

5. The packaging box according to claim 4, having four side surfaces, wherein
the folded tip indicator is fixed to two adjacent side surfaces of the four side surfaces such that the folding position runs along a ridge line, with the first indicator portion fixed to one of the two adjacent side surfaces and the second indicator portion fixed to another of the two adjacent side surfaces.

6. A tip indicator that is fixed to a side surface of a packaging box configured to package an article to be packaged and indicates an overturned state of the packaging box, comprising:
a main body that includes a passage portion,
a moving object that is disposed movably in the passage portion, and
a sight window that allows visual confirmation of the moving object,
wherein
the passage portion includes a first holding portion and a second holding portion that hold the moving object, and
in a case where the main body is located at an initial position, the moving object is held by the first holding portion, and in a case where the main body rotates 90° in a first direction from the first holding portion to the second holding portion, thereafter, rotates 90° in a second direction opposite to the first direction to return to the initial position, the moving object moves in the passage portion to be held by the second holding portion,
the main body includes a front surface layer in which the sight window is disposed to oppose at least one of the first holding portion and the second holding portion, a rear surface layer that opposes the side surface of the packaging box, and an intermediate layer that is sandwiched by the front surface layer and the rear surface layer and provided with the passage portion,
the front surface layer, the rear surface layer, and the intermediate layer are formed of a single plate material, and
the main body is formed to have a three-layer structure by being folded between the front surface layer and the intermediate layer and between the intermediate layer and the rear surface layer.

7. The tip indicator according to claim 6, wherein
the passage portion is formed into a substantially U-shape that is composed of a first passage portion, a second passage portion, and a third passage portion which connects one end of the first passage portion and one end of the second passage portion to each other, wherein the first holding portion is arranged at another end side of the first passage portion, and the second holding portion is arranged at another end side of the second passage portion.

8. The tip indicator according to claim 7, wherein
in the case where the main body is located at the initial position, the passage portion has the substantially U-shape opened downward in which each of the first passage portion and the second passage portion extends downward from the third passage portion, and
the substantially U-shape is inclined in the first direction with respect to the side surface of the packaging box.

9. A packaging box to which the tip indicator according to claim 6 is fixed.

* * * * *